US011456946B2

(12) United States Patent
Tonkovic et al.

(10) Patent No.: US 11,456,946 B2
(45) Date of Patent: Sep. 27, 2022

(54) REGULAR PATH QUERIES (RPQS) FOR DISTRIBUTED GRAPHS

(71) Applicant: Oracle International Corporation, Redwood Shores, CA (US)

(72) Inventors: Petar Tonkovic, Zurich (CH); Vasileios Trigonakis, Zurich (CH); Tomas Faltin, Prague (CZ); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 16/899,185

(22) Filed: Jun. 11, 2020

(65) Prior Publication Data
US 2021/0392073 A1    Dec. 16, 2021

(51) Int. Cl.
*H04L 45/00* (2022.01)
*G06F 9/54* (2006.01)
*G06F 16/901* (2019.01)
*H04L 47/122* (2022.01)

(52) U.S. Cl.
CPC .............. *H04L 45/20* (2013.01); *G06F 9/544* (2013.01); *G06F 9/546* (2013.01); *G06F 16/9024* (2019.01); *H04L 45/38* (2013.01); *H04L 47/122* (2013.01)

(58) Field of Classification Search
CPC . G06F 16/901; G06F 9/54; G06F 9/48; G06F 9/45; G06T 17/10; G01S 7/4863; H04W 4/00
See application file for complete search history.

(56) References Cited

U.S. PATENT DOCUMENTS

| 6,092,062 A | 7/2000 | Lohman |
| 8,234,233 B2 | 7/2012 | Zhou |
| 8,543,517 B2 | 9/2013 | Shotton |

(Continued)

FOREIGN PATENT DOCUMENTS

| CN | 110427359 A | 11/2019 |
| CN | 110609911 A | 12/2019 |

(Continued)

OTHER PUBLICATIONS

Riggan, Taylor, et al., "Using SPARQL explain to understand query execution in Amazon Neptune", AWS Database Blog, https://aws.amazon.com/blogs/database/using-sparql-explain-to-understand-query-execution-in-amazon-neptune/, Sep. 17, 2019, 10pgs.

(Continued)

*Primary Examiner* — Iqbal Zaidi
(74) *Attorney, Agent, or Firm* — Hickman Becker Bingham Ledesma LLP

(57) ABSTRACT

A pattern matching engine interprets a query into a data structure resembling a finite state machine. Vertices in the query pattern are treated as states or stages, while edges connecting them are treated as state transitions or hops. To match the full pattern, the first stage is first matched by applying vertex filters, if any. If the vertex is eligible, its edges that satisfy the edge filters, if any, are followed to move to the neighbors that can potentially produce results, thus progressing to the next stage. This process is repeated; if all stages are matched, then the whole pattern has been matched successfully.

20 Claims, 8 Drawing Sheets

(56) References Cited

U.S. PATENT DOCUMENTS

| | | |
|---|---|---|
| 9,135,565 B1 | 9/2015 | Khalefa |
| 9,165,283 B2 | 10/2015 | Scheidl et al. |
| 10,445,319 B2 | 10/2019 | Weld |
| 2005/0015511 A1 | 1/2005 | Izmailov |
| 2006/0256797 A1 | 11/2006 | Bernabeu-Auban et al. |
| 2012/0109889 A1 | 5/2012 | Wu |
| 2015/0261817 A1 | 9/2015 | Harris |
| 2016/0306896 A1 | 10/2016 | Paradies |
| 2017/0004005 A1 | 1/2017 | Elliott et al. |
| 2017/0091246 A1 | 3/2017 | Risvik |
| 2017/0118042 A1 | 4/2017 | Bhattacharya |
| 2017/0147644 A1 | 5/2017 | Lee |
| 2017/0177870 A1 | 6/2017 | Hildebrand |
| 2018/0329958 A1 | 11/2018 | Choudhury |
| 2019/0057539 A1 | 2/2019 | Stanard et al. |
| 2019/0205178 A1 | 7/2019 | Lee et al. |
| 2019/0370695 A1 | 12/2019 | Chandwani |
| 2020/0117762 A1 | 4/2020 | Haprian et al. |
| 2021/0089580 A1 | 3/2021 | Deng |
| 2021/0110508 A1 | 4/2021 | Mellempudi et al. |
| 2021/0216590 A1 | 7/2021 | Delamare |
| 2021/0240705 A1 | 8/2021 | Trigonakis |
| 2021/0373938 A1 | 12/2021 | Koupy |
| 2021/0383600 A1* | 12/2021 | Uhrenholt ............. G06T 15/005 |
| 2022/0179859 A1 | 6/2022 | Faltin et al. |

FOREIGN PATENT DOCUMENTS

| | | |
|---|---|---|
| JP | 2016106329 A | 6/2016 |
| WO | WO2019218814 A1 | 11/2019 |

OTHER PUBLICATIONS

Amazon Neptune Features, www.aws.amazon.com/neptune/features/, printed on Oct. 7, 2021, 8 pages.

Delamare, U.S. Appl. No. 16/738,972, filed Jan. 9, 2020, Notice of Allowance and Fees Due, dated Nov. 10, 2021.

Rowe, Walker, BMC blogs, "Introduction to the Neo4j Graph Database", Mar. 21, 2019, https://www.bmc.com/blogs/neo4j-graph-database/, 19pgs.

Tiger Graph, "Cool Vendor in Data Management", Advanced Analytics on Connected Data, dated 2020, 3 pages.

Roth et al., "PGX.D/Async: A Scalable Distributed Graph Pattern Matching Engine", dated 2017 Publication rights licensed to ACM, 6 pages.

PGQL 1.2 Specification, "Property Graph Query Language", dated Feb. 20, 2019, 79 pages.

Neo4j, "Neo4j Graph Platform", https://neo4j.com, last viewed on Jun. 17, 2020, 14 pages.

Jin et al., "3-HOP: A High Compression Indexing Scheme for Reachability Query", SIGMOD'09, Jun. 29-Jul. 2, 2009, Providence, Rhode Island, USA, 14 pages.

Databricks, "Graph Analysis Tutorial With GraphFrames", dated Mar. 17, 2019, 2 pages.

Amazon Neptune, Fast Reliable Graph Database Built for the Cloud, www.aes.amazon.com/neptune, last viewed on Jun. 16, 2020, 16 pages.

Ma et al., "G-SQL: Fast Query Processing via Graph Exploration", Proceedings of the VLDB Endowment, vol. 9, No. 12, DOI: 2150-8097/16/08, dated 2016, 12 pages.

Azure Cosmos DB, "Fast NoSQL Database with Open APIs for any Scale", https://azure.microsoft.com/en-GB/services/cosmos-db, dated 2018, 20 pages.

Boncz et al., Breaking the Memory Wall in MonetDB, Communications of the ACM, vol. 15, No. 12, dated Dec. 2008, 9 pages.

Buleon, "OrientDB—The Multi-Model and Graph Database", Info-H-415: Advanced Databases, http://orientdb.com/docs/last/index.html, dated 2017, 20 pages.

Chen et al., G-Minor: An Efficient Task-Oriented Graph Mining System, EuroSys 2018, Association for Computing Machinery, https://doi.org/10.1145/3190508.3190545, dated April 2018, 12 pages.

Dave et al., GraphFrames: An Integrated API for Mixing Graph and Relational Queries, GRADES 2016, DOI: http://dx.doi.org/10.1145/2960414.2960416, dated Jun. 2016, 8 pages.

David et al., "Asynchronized Concurrency: The Secret to Scaling Concurrent Search Data Structures", ASPLOS 2015, http://dx.doi.org/10.1145/2694344.2694359, dated Mar. 2015, 14 pages.

Dubey et al., "Weaver: A High-Performance, Transactional Graph Database Based on Refinable Timestamps", Proceedings of the VLDB Endowmwnt, vol. 9, No. 11, https://arxiv.org/pdf/1509.08443.pdf, dated 2016, 12 pages.

Hong et al., "PGX.D: A Fast Distributed Graph Processing Engine", High Performance Computing, Networking and Storage Conference, SC 2015, DOI: http://dx.org/10.1145/2807591.2807620, dated Nov. 2015, 12 pages.

Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.

Kankanamge et al., "Graphflow: An Active Graph Database", SIGMOD 2017, DOI: http://dx.doi.org/10.1145/3035918.3056445, dated May 2017, 4 pages.

Khandelwal et al., "ZipG: A Memory-Efficient Graph Store for Interactive Queries", SIGMOD 2017, DOI: http://dx.doi.org/10.1145/3035918.3064012, dated May 2017, 16 pages.

Kim et al., "TurboFlux: A Fast Continuous Subgraph Matching System for Streaming Graph Data", SIGMOD 2018, DOI: https://doi.org/10.1145/3183713.3196917, dated Jun. 2018, 16 pages.

Abdelaziz et al.,"Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.

Lumsdaine et al., "Challenges in Parallel Graph Processing", World Scientific Publishing Company, Parallel Processing Letters, dated Jan. 2007, 16 pages.

Zaharia et al., "Resilient Distributed Datasets: A Fault-Tolerant Abstraction for In-Memory Cluster Computing", 9th USENIX Symposium on Networked Systems Design and Implementation, dated Apr. 2012, 14 pages.

Microsoft Graph Engine, "Graph Engine: Serving Big Graphs in Real-Time", https://www.graphengine.io, dated 2017, 2 pages.

Müller, "Engineering Aggregation Operators for Relational In-Memory Database Systems", Karlsruhe Institute of Technology, Germany, dated 2016, 197 pages.

Openquery.com, "OQGRAPH Engine for MariaDB", https://openquery.com.au/products/graph-engine, dated Apr. 2008, 4 pages.

Page et al., "The PageRank Citation Ranking: Bringing Order to the Web", http://ilpubs.stanford.edu:8090/422/1/1999-66.pdf, dated Jan. 1998, 17 pages.

Sarwat et al., "Horton+: A Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.

Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.

Shao et al., "Trinity: A Distributed Graph Engine on a Memory Cloud", SIGMOD 2013, https://dl.acm.org/doi/abs/10.1145/2463676.2467799, dated Jun. 2013, 12 pages.

Sharma, "Dragon: A Distributed Graph Query Engine", Facebook Engineering, https://code.fb.com/datainfrastructure/dragon-a-distributed-graph-query-engine, dated Mar. 2016, 7 pages.

Spyropoulos et al., "Digree: Building A Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.

The Linux Foundation, "JanusGraph", https://docs.janusgraph.org, dated 2020, 3 pages.

Titan.thinkaurelius.com, Chapter 3: Getting Started, s3.thinkaurellus.com/docs/titan/1.0.0/getting-started.html, dated 2015, 8 pages.

Virtuoso Universal Server, "Data-Driven Agility without Compromise", http://virtuoso.openlinksw.com, dated 2019, 10 pages.

(56) References Cited

OTHER PUBLICATIONS

Yars et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.
Labouseur et al., "The G* Graph Database: Efficiently Managing Large Distributed Dynamic Graphs", Springer Science+Business Media, Distrib Parallel Databases, DOI: 10.1007/S10619-014-7140-3, dated Mar. 2014, 36 pages.
Lyu et al., "DBL: Reachability Queries on Dynamic Graphs", Technical Report, dated Jan. 4, 2019, 27 pages.
Adcock et al., "Evaluating OpenMP Tasking at Scale for the Computation of Graph Hyperbolicity", IWOMP dated 2013, 13 pages.
Amazon Neptune "Features", https://aws.amazon.com/neptune/, 8 pages, last viewed on Mar. 9, 2020.
Amazon Neptune, "Overview", https://aws.amazon.com/neptune/, last viewed on Mar. 9, 2020, 16 pages.
Apache Spark, "GraphX", Spark 2.3.4 released (/news/spark-2-3-4-released.html), dated Sep. 9, 2019, 3 pages.
ArangoDB, "Distributed Iterative Graph Processing", dated Feb. 17, 2020, 8 pages.
Cong et al., "Solving Large, Irregular Graph Problems using Adaptive Work-stealing", dated 2008, 10 pages.
Dekel et ak, "Cachesensitive Optimization of Immutable Graph Taversais (CS745 Project Report)", ACM, dated 2015, 9 pages.
Elshawi et al., "Big Graph Processing Systems: State-of-the-art and Open Challenges", dated 2015 IEEE First International Conference on Big Data Computing Service and Applications, 10 pages.
Gonzalez et al., "GraphX: Graph Processing in a Distributed Dataflow Framework", dated 2014, 15 pages.
Harris, Tim, "Callisto-RTS: Fine-Grain Parallel Loops", dated Jul. 2015, 13 pages.
Hodler et al., "An Overview of Graph Algorithms in Neo4j", Neo4j, White Paper, dated 2018, 10 pages.
18C Oracle, "Spatial and Graph Analytics with Grade Database 18c", White Paper, dated Feb. 2018, 32 pages.
Low et al. "GraphLab: A New Framework For Parallel Machine Learning", dated 2014, 10 pages.
Zhang et al., "REGTT: Accelerating Tree Traversals on GPUs by Exploiting Regularities", dated 2016, 10 pages.
Morishima et al., "Performance Evaluations of Graph Database using CUDA and OpenMP Compatible Libraries", ACM SIGARCH Computer Architecture News, dated Jun. 2014, 6 pages.
Neo4j, "Graph and Machine Learning Algorithms", dated 2019, 9 pages.
Oracle, "Oracle Big Data Appliance X7-2", dated 2017, 10 pages.
PGQL, "Property Graph Query Language", Oracle, dated 2019, 5 pages.
Priya et al., "A Survey on Realizing Memory-Optimized Distributed Graph Processing", IOSR Journal of Engineering (IOSRJEN), vol. 8, Issue 8 dated Aug. 2018, 7 pages.
Rest, Oskar van et al., "PGQL: a Property Graph Query Lanuage", ACM, dated 2016, 6 pages.
Sakr et al., "Large Scale Graph Processing Using Apache Giraph", dated Mar. 20, 2017, 244 pages.
Salihoglu et al. "GPS: A Graph Processing System", SSDBM: Proceedings of the 25th International Conference on Scientific and Statistical Database Management, dated Jul. 2013, 31 pages.
Spark 2.4.5, "GraphX Programming Guide", dated Apr. 1, 2020, 23 pages.
Tada et al., "On the Robustness of the Soft State for Task Scheduling in Large-scale Distributed Computing Environment", IEEE, dated 2008, 7 pages.
Tigergraph's Native Parallel Graph, dated 2020, 2 pages.
Viehmann et al., "Introduction to Graph Analytics and Oracle Cloud Service", dated Oct. 22, 2018, 43 pages.
Ingalls et al., "Eliminating Canceling Edges From the Simulation Graph Model Methodology", Proceedings of the 1996 Winter Simulation Confrence, dated 1996, 8 pages.
Trigonakis, U.S. Appl. No. 16/778,668, filed Jan. 31, 2020, Non-Final Rejection, dated Oct. 1, 2021.
Delamare, U.S. Appl. No. 16/738,972, filed Jan. 9, 2020, Notice of Allowance and Fees Due, dated Oct. 4, 2021.
Trigonakis, U.S. Appl. No. 16/778,668, filed Jan. 31, 2020, Advisory Action, dated Jun. 30, 2022.

* cited by examiner

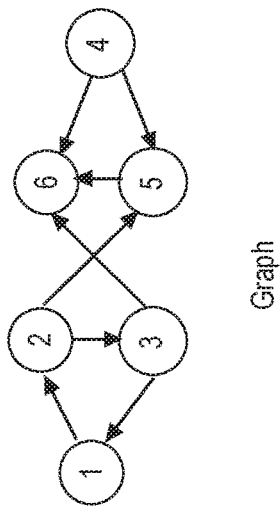
Fig. 1A
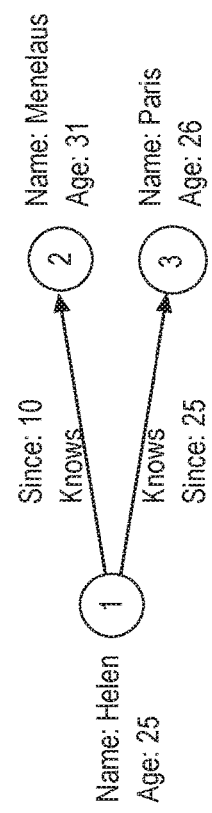
Fig. 1B
Fig. 1C
Persons Table
| Vertex ID | Name | Age |
|---|---|---|
| 1 | Helen | 25 |
| 2 | Menelaus | 31 |
| 3 | Paris | 26 |
Knows Table
| Edge ID | Source Vertex id | Destination Vertex ID | Since |
|---|---|---|---|
| 1 | 1 | 2 | 10 |
| 2 | 1 | 3 | 25 |

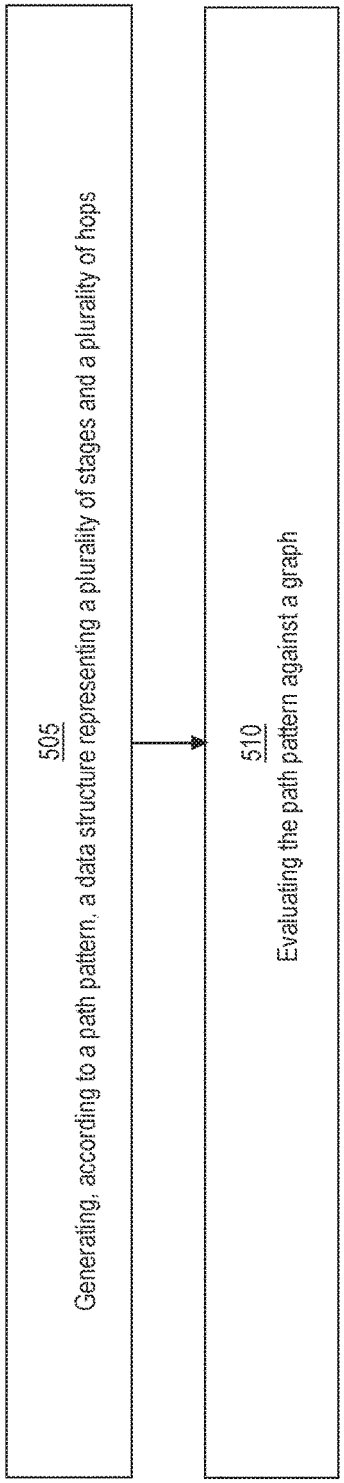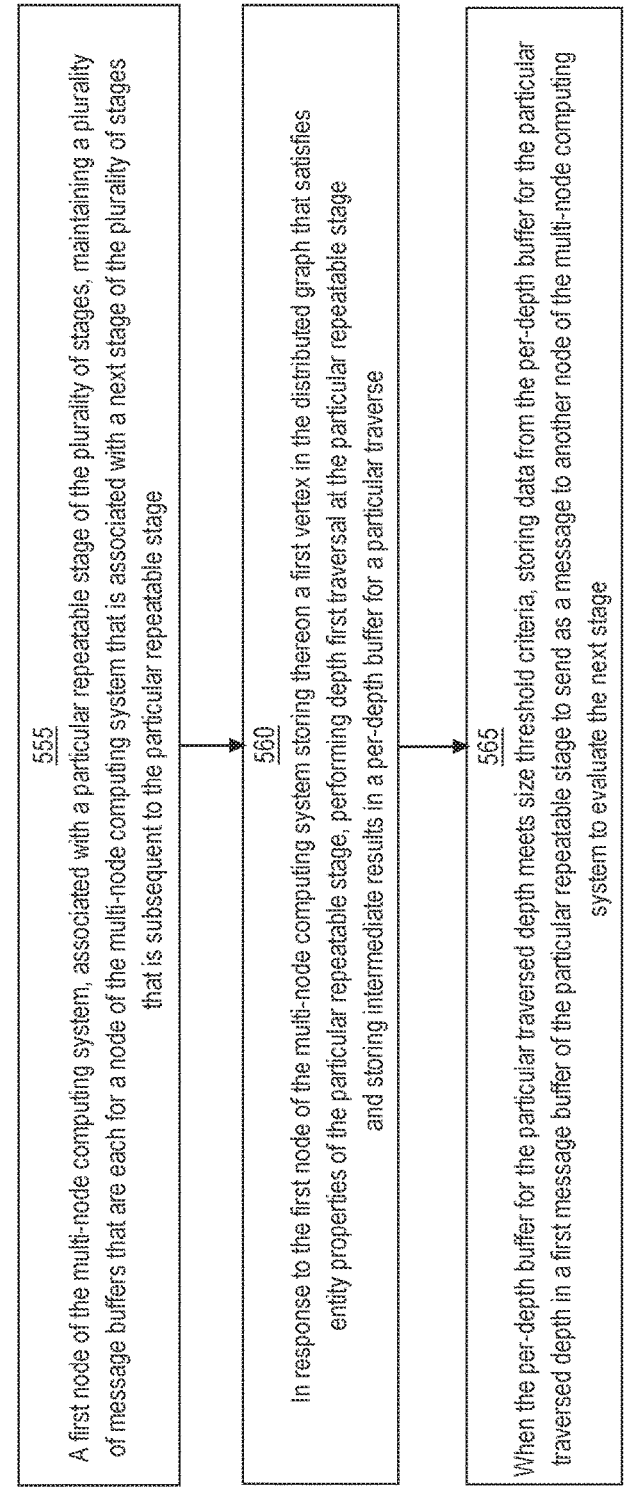

REGULAR PATH QUERIES (RPQS) FOR DISTRIBUTED GRAPHS

FIELD OF THE INVENTION

The present disclosure relates to techniques for graph searches. More specifically, the disclosure relates to a DFT approach for computing graph queries on distributed graphs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A regular path query (RPQ) contains a regular expression in a path pattern. To answer RPQs, especially with unbounded quantifiers, such as + or *, is a very computationally-heavy workload. The search for an unbounded RPQ is the known problem of searching for the transitive closure of a subgraph. A search tries to decide whether there exists a path between given pair of vertices (a, b) according any given restrictions, such as specified restrictions for edges and vertices along the path. The problem becomes even more complex in the context of graph queries (e.g., with PGQL), as these restrictions are given at runtime in the query by a user and are not known in advance.

There are two possible extreme solutions on how to solve this problem with regard to index size and query time, with other solutions being somewhere in between and try to find a balance between these two extreme approaches.

On one extreme, reachability between two vertices is computed with depth first search (DFS) or breadth first search (BFS) without any index, which takes O(N+E) time per vertex pair (where N is a number of vertices, E is number of edges).

On another extreme, an index is built and used to decide whether there is a path between a vertex pair (a, b). Deciding whether there is a path between the vertices takes O(1). However, the index consumes O(N^2) memory and is built in O(N*E) time. In particular, a RPQ is evaluated by reducing the regular path pattern down to a single hop via intermediate data structures in the form of reachability indices or reachability graphs. A reachability index for a regular graph pattern keeps all pairs (a, b) such that a and b are connected by the underlying pattern. Similarly, a reachability graph is a graph with the same vertices as the original graph and there is an edge between vertex a and vertex b only if there is a path that respects the pattern from a to b.

With these approaches, a pre-processing step is done to calculate the reachability indices/graphs for each common path expression in an input query that is used as basis for a regular path pattern. Once the reachability indices/graphs have been constructed, common path expressions are reduced to single hops. Afterwards, a search algorithm, depth first search (DFS) or breadth first search (BFS), can be deployed on top of these intermediate representations to compute the actual reachability.

However, there are several issues with these pre-processing-based approaches. For example, these approaches require a pre-processing step that can be very expensive (both computationally and in terms of memory) in a distributed setting. After all, constructing a reachability graph/index is equivalent to solving an RPQ query with one single RPQ pattern. Some approaches use BFS exploration for computing these reachability graphs/indices. In a distributed setting, the reachability graph creation and storage are also distributed, which add a layer of complexity.

Another issue with these approaches is that the reachability graph is fixed for a given input pattern and not reusable across, or even within queries. If the query has more than one regular path pattern, a reachability graph needs to be constructed for each pattern. Furthermore, these approaches separate the reachability calculation for each regular path pattern, but in the end, the reachability still needs to be solved using some search algorithm.

Therefore, there is a need for a solution to address these challenges found when processing graph queries on distributed graphs.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 1A illustrates an example graph and an example target pattern.

FIG. 1B illustrates an example property graph.

FIG. 1C illustrates example tables associated with the graph of FIG. 2A.

FIGS. 5B-5C illustrate an example flow diagram that depicts a process for evaluating an RPQ on a distributed graph.

DETAILED DESCRIPTION

Figure 2A:
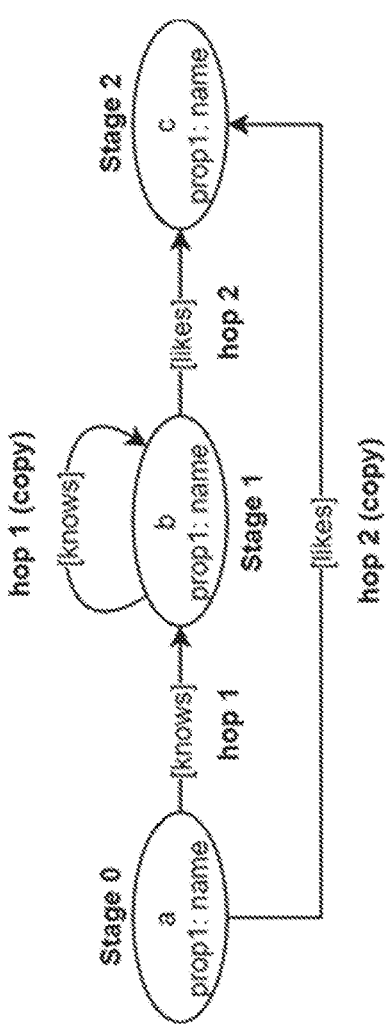
FIGS. 2A-2D illustrate example state machine diagrams.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Many datasets featuring entities that have various interactions between each other can easily and intuitively be modeled as graphs. Graph processing is thus becoming an increasingly popular topic, both in research and industry. Being able to process and extract information from graphs efficiently is highly demanded.

Regular path queries significantly increase a user's power to extract knowledge from graphs by overcoming the severe limitations of fixed length path queries. However, these pattern matching processes can be very expensive. As a result, being able to distribute this workload across multiple machines is of big importance to significantly reduce query execution time, as well as provide enough memory so that the computation can be performed on very large graphs.

Techniques described herein evaluate regular path queries (RPQs), query patterns that include regular expressions, on distributed graphs, by extending asynchronous graph pattern-matching engines with a depth-first approach to evaluate RPQs. The techniques thin out computation the deeper the matching and ensure that the deepest computations can always continue to execute. As a result, regular path patterns can be matched in a distributed setting using minimal intermediate memory.

Background in Graph Processing Systems

A graph is a data structure used to model relationships between entities. A graph consists of a set of vertices (corresponding to entities) and a set of edges (corresponding to relationships). When data for a specific application has many relevant relationships, the data may be represented by a graph.

Graph processing systems can be split in two classes: graph analytics and graph querying. Graph analytics systems have a goal of extracting information hidden in the relationships between entities, by iteratively traversing relevant subgraphs or the entire graph. Graph querying systems have a different goal of extracting structural information from the data, by matching patterns on the graph topology.

Background in Graph Pattern Matching

Graph pattern matching refers to finding subgraphs, in a given directed graph, that are homomorphic to a target pattern. FIG. 1A illustrates an example graph and an example target pattern. If the target pattern is (a)→(b)→(c)→(a), then corresponding graph walks or paths of FIG. 1A are the following:
- (1)→(2)→(3)→(1),
- (2)→(3)→(1)→(2), and
- (3)→(1)→(2)→(3).

One hop corresponds to a graph walk consisting of a single edge. A walk with n edges is considered as a n-hop pattern.

Translation from Relational Model to Property Graph Model

A property graph data model allows vertices and edges in a graph to have arbitrary properties as key-value pairs. FIG. 1B illustrates an example property graph. The property graph in FIG. 1B represents contact relationships between persons. The persons have name and age properties, while the relationships have a property indicting the age at which the subject knew the other person.

Conceptually, a relational DBMS may be interpreted in a graph model. For example, all vertices and their properties may be grouped in a vertex table, while all relationships and their properties may be grouped in an edge table. As an example, the graph illustrated in FIG. 1B may be stored in a RDBMS as tables, as illustrated FIG. 1C. Each vertex has a unique identifier (i.e., Vid) in the vertex table (i.e., Persons Table) where it is stored. Similarly, each edge has a unique identifier (i.e., Eid) in the edge table (i.e., Knows Table) where it is stored. The edge table can be used for matching patterns; the vertex and edge tables can then be used for accessing the desired information when the pattern is matched. The RDBMS keeps track of the referenced tables by each edge table, in order to be able to reconstruct the graph structure.

Example Queries

A graph may be very large and distributed in the memory of a plurality of machines or nodes (e.g., vertices and edges are partitioned such that every vertex resides on a single machine). It may have both directed and undirected edges. It may contain cycles, and its vertices and edges may have labels and properties. A graph query is evaluated to find all graph patterns that are homomorphic to a pattern in the query and output the desired selected information with respect to those patterns. In the case of RPQs, a single query pattern may produce multiple (potentially even infinite if the graph is cyclic) duplicate results, in which case each result may be included once in the final output.

Table 1 shows a simple query example, which is a fixed pattern with no regular expression.

TABLE 1

SELECT a.name, b.name
FROM g MATCH (a) -[:knows]-> (b)

In this non-RPQ, which is also referred to as a non-reachability query, shown in Table 1, the names of all pairs (a, b) for which there is an edge with the label "knows" between a and b are returned.

Table 2 shows an RPQ example, wherein the "+" matches paths of length 1 or more.

TABLE 2

SELECT a.name, b.name
FROM g MATCH (a) -/:knows+/-> (b)

In this RPQ shown in Table 2, the names of all pairs (a, b) for which there is a directed path in the graph of length 1 or more following edges with the label "knows" between a and b are returned.

There are other possible graph pattern quantifiers that can specify the depth of the regular paths. These graph pattern quantifiers include the following:

ZeroOrMore (*)—a path that connects the source and destination of the path by zero or more matches of a given pattern OneOrMore (+)—a path that connects the source and destination of the path by one or more matches of a given pattern Optional (?)—a path that connects the source and destination of the path by zero or one matches of a given pattern ExactlyN ({n})—a path that connects the source and destination of the path by exactly n matches of a given pattern NOrMore ({n,})—a path that connects the source and destination of the path by at least n matches of a given pattern BetweenNAndM ({n,m})—a path that connects the source and destination of the path by at least n and at most BetweenZeroAndM ({,m})—a path that connects the source and destination of the path by at least 0 and at most m (inclusive) matches of a given pattern Graph languages, such as PGQL, also support more complex regular paths via common path expressions, which are macros that store path patterns as variables that can later be used in RPQs. Table 3 shows another RPQ example.

TABLE 3

PATH connects to AS (g1:Generator) -[:has_connector]-> (c:Connector)
<-[:has_connector]- (g2:Generator)
    WHERE c.status = 'OPERATIONAL'
SELECT generatorA.location, generatorB.location
    FROM g MATCH (g1) -/:connects_to+/-> (g2)

In this RPQ shown in Table 3, the query returns the locations of all pairs of generators that are connected with one or more intermediate operational connectors. This complicates graph pattern matching since it is no longer a single edge that is the subject of a regular expression but a whole path pattern.

High-Level Design

In an embodiment, an underlying pattern matching engine interprets a query into a data structure resembling a finite state machine. Vertices in the query pattern are treated as states (referred herein as stages), while edges connecting them are treated as state transitions (referred herein as hops). In order to match the full pattern, the first stage is first matched by applying vertex filters, if any. Then, if the vertex is eligible, its edges that satisfy the edge filters, if any, are followed to move to the neighbors that can potentially produce results, thus progressing to the next stage. This process is repeated. If all stages are matched, then the whole pattern has been matched successfully. For instance, the simple query shown in Table 1 is translated or interpreted into stages and hops illustrated in FIG. 2A.

In an embodiment, matching is done stage by stage "on the fly" as a graph is traversed. Resulting stages for non-RPQs form a list, as illustrated in FIG. 2A. All hops are progressing towards a later stage and there are no hops backwards.

Figure 2B:
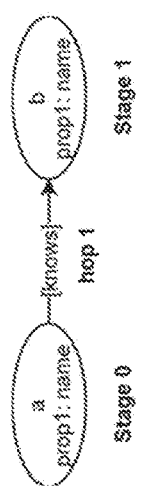

To match RPQs in a similar way, techniques described herein introduce additional hops from certain stages that can lead the computation back to previously matched stages. As a result, resulting stages no longer form a list. Instead, resulting stages form a graph. Some stages in the graph are visited or matched more than once. These stages are referred to as repeatable or recurrent stages. For instance, the RPQs shown in Table 2 and Table 3 are translated or interpreted into stages and hops as illustrated in FIG. 2B and FIG. 2C, respectively.

An RPQ may be interpreted into both non-repeatable and repeatable stages. An RPQ pattern contains one source and one destination vertex and, therefore, the first stage corresponding to the source, which is always a non-repeatable stage.

If an RPQ is simple (e.g., the RPQ shown in Table 2), then there is only one stage that is repeatable, and it has an additional hop back to itself. In a more complex case of common path expressions (e.g., the RPQ shown in Table 3), then there are multiple repeatable stages, and the last repeatable stage has an additional hop, which is a copy of the hop from the first stage in the common path expression.

If an RPQ allows paths of length 0 (e.g., with the * quantifier), then the repeatable stages can be skipped entirely and the first stage from the regular path pattern should be able to continue to the next non-repeatable stage and directly produce an output. Table 4 shows a shows an RPQ, wherein the "*" matches paths of length 0 or more.

TABLE 4

Figure 2D:
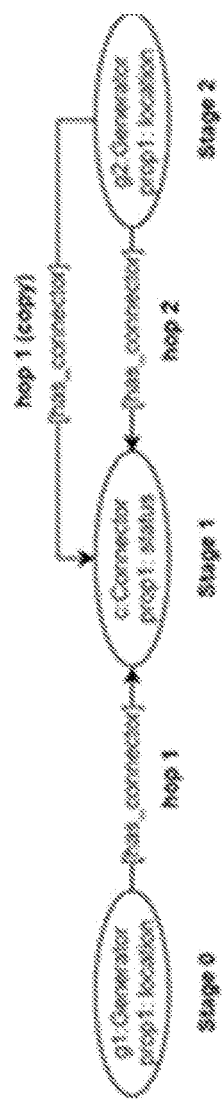
Figure 2C:
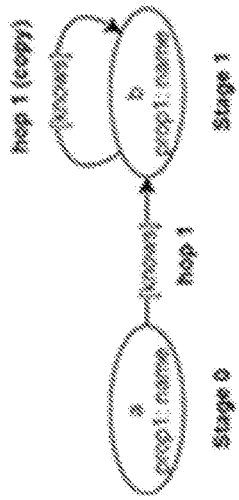

SELECT a.name, b.name, c.name
    FROM g MATCH (a) -/:knows*/-> (b) -[:likes]-> c The RPQ shown in Table 4 is interpreted into stages and hops as illustrated in FIG. 2D. Stage 0 can skip the repeatable Stage 1 and progress directly to Stage 2, because the RPQ allows zero repetitions of the regular path pattern.

To distinguish between the multiple matches of a single stage, as well as to be able to answer RPQs with specific ranges for the number of repetitions of a pattern, the depth of the repeatable stage matching (e.g., the number of times the repeatable stage has been visited) is tracked. This is crucial for defining the termination protocol for the matching process but also for making sure that priority is always given to the deeper depths so that results can be reached sooner and free resources for other computations (DFT oriented). Since computation can go as deep as the maximal path length in the graph (equals to the number of vertices minus one in the worst case), the DFT approach is used, which thins out computation on deeper levels and avoids memory explosions from keeping a lot of intermediate results.

The techniques described herein can be used with different runtimes of the non-RPQs parts of queries.

Distributed Graphs

In a distributed environment, a graph is partitioned and distributed across several machines or nodes such that each vertex resides on exactly one machine. As a result, there are two types of edges: local edges and remote edges. A local edge is an edge connecting two vertices on the same machine. A remote edge is an edge connecting vertices from different machines.

The techniques described herein adhere to the design practices of an asynchronous graph pattern-matching engine, including:
  Depth first traversal (DFT) for local computations to eagerly produce results and reduce the number of intermediate results;
  Bread first style asynchronous messaging to avoid blocking local computations; and
  Use almost fixed runtime memory for intermediate results to be able to work with large graphs.

These techniques may also be used in conjunction with other solutions. For example, the techniques can provide the runtime for building the reachability graphs or indices.

Matching Non-Repeatable Stages

In an embodiment, computation on local edges, using depth first traversal (DFT), is performed to eagerly produce results and to reduce the number of intermediate results, until computation is required for a remote edge.

DFT for local edges. Each machine has several worker threads that do local pattern matching in a depth first manner by applying a stage of the query and using the hop of the stage to proceed to the next stage. The local computation continues as long as the thread is running into local edges. If there is only one machine, the whole pattern matching is done in DFT mode.

Asynchronous messaging for remote edges. Message buffers may be pre-allocated in hardware, such as hardware network card (zero-copy messaging), to guarantee fixed memory consumption. Buffers in hardware improve performance. In some embodiments, buffers may be statically allocated in system memory. Each stage has dedicated message buffers for the next stage on each machine. Flow control limits the number of outgoing unacknowledged messages. In an embodiment, messages are acknowledged once they have been processed on the next machine. Limiting the number of outgoing messages automatically limits the number of incoming messages from other machines that can be received at the machine.

Once a worker thread reaches a remote edge, computation is continued on another machine. All necessary information to continue computation is packed in an intermediate result (IR). The IR is stored in the appropriate message buffer associated with the remote machine. If there is no space in the message buffer, the thread tries to send it to make space. If sending is not successful due to flow control blocks, then the thread does other local work and tries again later. Since the IR contains all information necessary for the computation to continue, the thread stops caring for that part of the computation and moves on to the next edge of the DFT.

In an embodiment, when threads pick up work from arriving messages, they prioritize messages from later stages to produce results sooner. In an embodiment, threads prioritize work from arriving messages over local work.

As a result, an asynchronous graph pattern-matching engine achieves fixed and configurable runtime memory for evaluating queries, non-blocking DFT due to the asynchronous nature of the runtime and zero-copy messaging since the IRs are directly stored in the message buffers. As described below, these are design goals that the techniques described herein preserve whenever possible when extending the asynchronous graph pattern-matching engine to support RPQs.

Anatomy of Repeatable Stages

Figure 3:
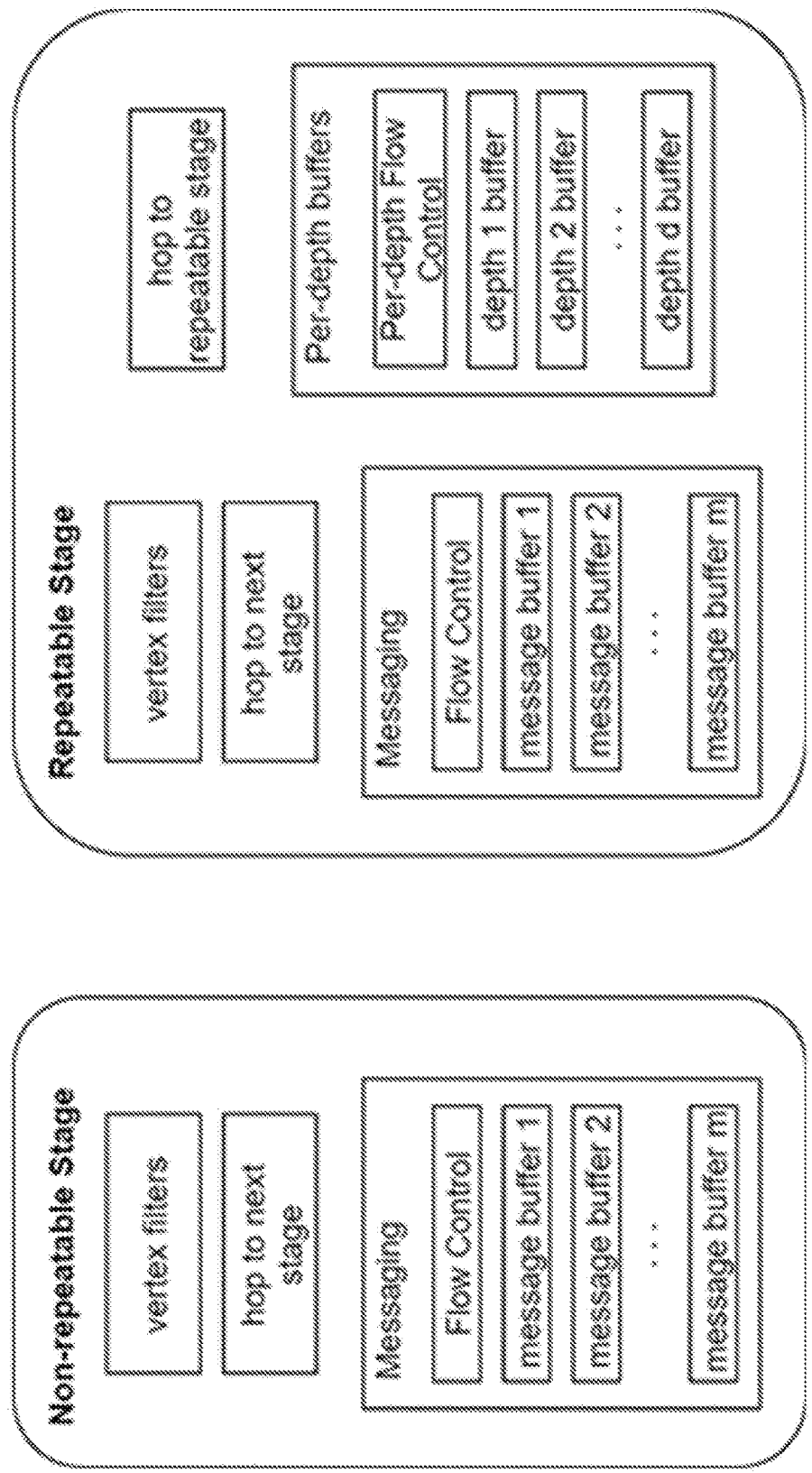
FIG. 3 illustrates differences between a repeatable stage and a non-repeatable stage.

The repeatable stages are similar to the non-repeatable stages, with differences regarding hops, flow control, and intermediate results. FIG. 3 illustrates the differences between a repeatable stage and a non-repeatable stage.

A repeatable stage has a second hop which is enabling the repeatability of the stages, in addition to the hop that is progressing the computation forward. For example, in the finite state machine diagram illustrated in FIG. 2D, Stage 1 has two hops: one progressing to Stage 2 and one leading back to itself. Each repeatable stage keeps track of any vertex filters, information regarding a hop to the next stage (e.g., any edge filters), and information regarding a hop to repeatable stage (e.g., depth counter).

Flow control has three components: a global stage flow control, a per-depth flow control, and a mechanism that ensures the deepest depths are never blocked. The global stage flow control limits the maximal number of outgoing messages from the repeatable stage to avoid message flooding. Alternatively, in an embodiment, size of intermediate data that are sent is limited.

The per-depth flow control limits the maximal number of outgoing messages from a given depth of the repeatable stage. It controls how much of the global limit can be used by a given depth and helps manage IR explosions for lower depths. In an embodiment, the stage keeps track of the maximal depth for which there is an outgoing unacknowledged message in that machine. If flow control blocks a message for a deeper depth than the current deepest, then the message bypasses flow control and is sent. This mechanism avoids livelocks and ensures the query evaluation is always progressing towards finishing.

When facing a remote edge, intermediate results are stored in per-depth buffers that are dynamically allocated in memory instead of being stored directly in the message buffers that are pre-allocated in hardware. The per-depth buffers are needed for the per-depth flow control. However, since the maximal depth is not known in advance, a fixed number of buffers cannot be pre-assigned to the stage. This combined with the per-depth flow control helps maintain high availability of the scarce pre-allocated message buffers. The per-depth buffers allow flexibility in terms of buffer size; if a query is consuming much memory, these buffers can be always set smaller to narrow the number of intermediate results that are produced at any time.

Matching Repeatable Stages

As described above, computation on local edges, using depth first traversal (DFT), is performed to eagerly produce results and to reduce the number of intermediate results, until computation is required for a remote edge.

DFT for local edges. In an embodiment, using the depth counter, traversal keep track of the depth of the matching starting with depth 0. A repeatable stage has two hops, which are both traversed in a depth first manner, with priority always given to the hop that progresses to a later stage.

As an example, consider the RPQ example from Table 4 and assume there are three vertices (v1, v2 and v3) residing locally on the same machine that satisfy the pattern. The following illustrates a pattern matching process.

1. Stage 0 is matched on vertex v1
2. The traversal continues to its neighbor v2 via hop 1
3. Stage 1 is matched on vertex v2
4. The traversal first continues to its neighbor v3 via hop 2
5. Stage 2 is matched on v3
6. Since there are no more stages, an output is produced, and the DFT backtracks to Stage 1
7. The traversal now takes the second hop from Stage 1 back to itself; the depth counter is increased by one and computation continues.

Asynchronous messaging for remote edges. For repeatable stages, per-depth buffers are allocated dynamically as new depths are discovered. Each depth has a dedicated buffer for the next depth, or the same one if it is an intermediate stage of a common path expression, on each machine.

When a thread reaches a remote edge leading to a repeatable stage, the thread tries to store the IR in the buffer for the appropriate depth. When there is no space, flow control is asked whether the per-depth buffer can be copied to a message buffer. The per-depth buffer is copied to the message buffer when allowed. When flow control allows sending the message buffer, the message buffer is immediately sent as a message. There are two options when flow control forbids the message buffer from being sent as a message because the runtime would otherwise exceed the resources limits that are set. If the current depth is deeper than all depths currently using the flow control allowance, then the message buffer is sent anyway. If the current depth is not the deepest one, in which case the computation is blocked, then the thread does other local work and tries again later. In this manner, the deepest computations are never blocked in favor of more shallow ones, ensuring progress.

A Graph Matching Example

Figure 5A:
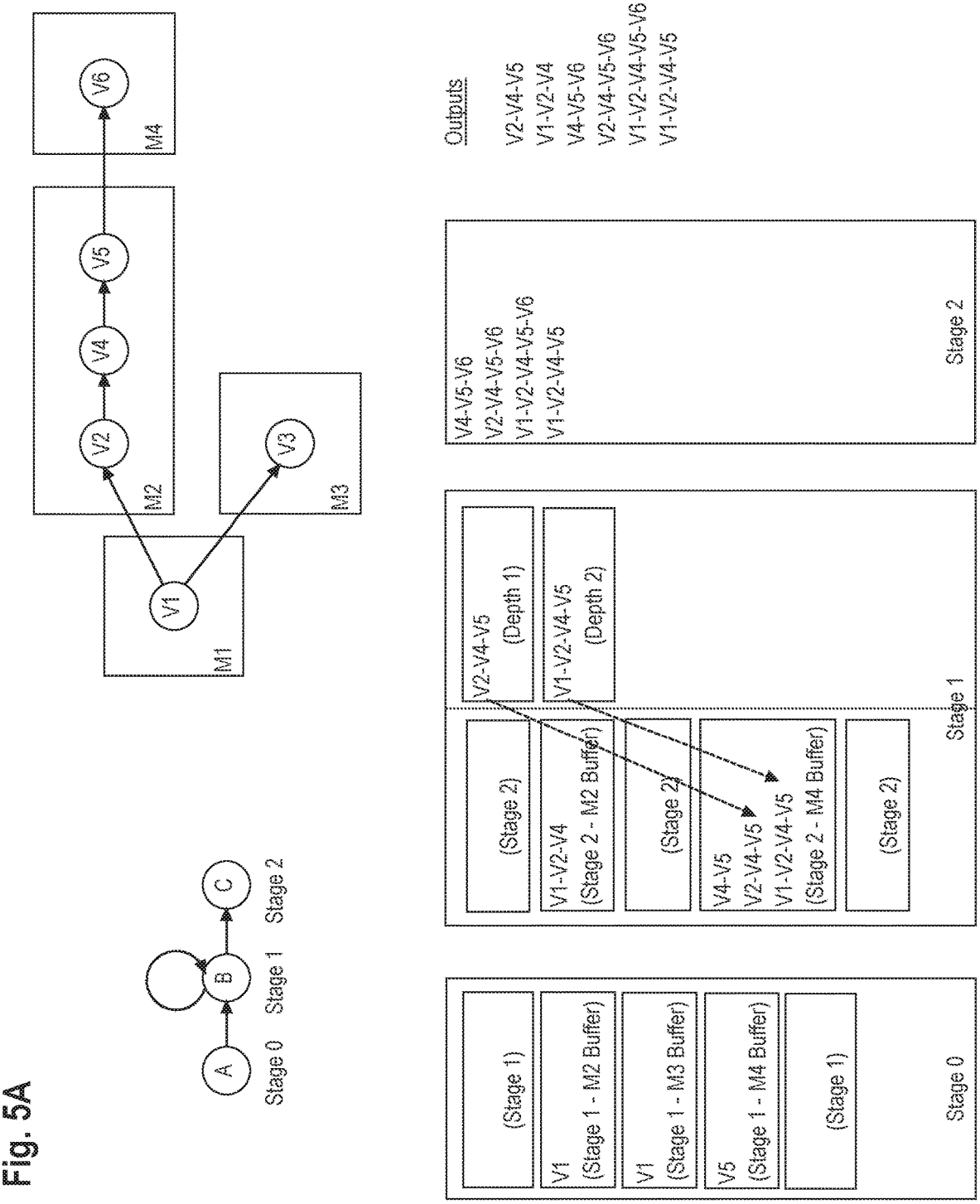
FIG. 5A illustrates an example graph and corresponding stage representations thereof

FIG. 5A illustrates an example graph and corresponding stage representations thereof. In FIG. 5A, a data structure resembling a finite state machine for a regular expression in a query is shown on the left, and a directed graph is shown on the right. Each vertex (denotated as V) resides or is stored on exactly one machine (denoted as M) of a plurality of machines. V1 resides on M1; V2, V4 and V5 reside on M2; V3 resides on M3; and, V6 resides on M4. Edges, each from one vertex to another vertex, are as shown.

The query is broken into stages. Each stage is responsible for visiting/matching one vertex. Each stage includes pre-allocated message buffers for each machine associated with the next stage. Stage 1, which is a repeatable stage, further includes dynamically allocated per-depth buffers, with each per-depth buffer allocated when a new depth is encountered at the repeatable stage. In FIG. 5A, other details of the stages are omitted so not to obscure the details of the message buffers and per-depth buffers.

Each machine has a plurality of worker threads that do local pattern matching in a depth first manner by applying a stage of the query and using the hop of the stage to proceed to the next stage. The local computation continues as long as the thread is running into local edges. Intermediate results are stored in those message buffers of the stage for corresponding remote machines when the thread reaches remote edges to vertices residing on the corresponding remote machines associated with the next stage. If the stage is a repeatable stage, then the intermediate results are first stored in per-depth buffers before being copied to the message buffers. The intermediate results in the message buffers are subsequently sent as messages to the remote machines for further local pattern matching. Each machine may start matching each vertex residing on that machine. However, when worker threads pick up work from arriving messages, they prioritize messages from later stages to produce results sooner.

Referring to FIG. 5A, on M1, Stage 0 is matched on V1 by a worker thread. Since the worker thread now reaches a remote edge, V1 is stored as intermediate results in the message buffer of Stage 0 for M2 and also in the message buffer of Stage 0 for M3 since there may be potential local matches on M2 and M3 that are associated Stage 1. Stage 0 messages including intermediate results stored in these message buffers are subsequently sent to corresponding M2 and M3 for matching at Stage 1.

On M3, although Stage 0 matches on V3, there are no outgoing edges from V3. As a result, DFT terminates.

Similarly, on M4, although Stage 0 matches on V6, there are no outgoing edges from V6. As a result, DFT terminates.

On M2, Stage 0 is matched on V2, V4, and V5 by one or more worker threads. Since a worker thread matching Stage 0 on V5 now reaches a remote edge, V5 is stored as intermediate results in the message buffer of Stage 0 for M4 since there may be a potential local match on M4 associated with Stage 1. A Stage 0 message including intermediate results stored in the message buffer is subsequently sent to M4 for matching at Stage 1.

DFT is performed for local computations to eagerly produce results. Accordingly, on M2, Stage 0 is matched on V2, Stage 1 is matched on V4, and Stage 2 is matched on V5 by a worker thread. Since there are no more stages, an output (e.g., V2-V4-V5) is produced, and the DFT backtracks to Stage 1 and depth first traversal is performed to the deepest depth indicated by the upper bound of the range of the regular expression corresponding Stage 1. In this example, the deepest depth is 1 at Stage 1 before an edge is encountered. The matched pattern V2-V4-V5 at depth 1 is stored as intermediate results in a corresponding depth 1 buffer of Stage 1. At some time later, the intermediate results in the depth 1 buffer are copied to the message buffer of Stage 1 for M4 since there may be a potential local match on M4 associated with Stage 2. A Stage 1 message including intermediate results stored in this message buffer is subsequently sent to M4 for matching at Stage 2. DFT recursively backtracks to depth 0 at Stage 1; however, Stage 1 does not match on any other vertices and DFT terminates.

Similarly, on M2, Stage 0 is matched on V4 and Stage 1 is matched on V5 by a worker thread. Since the worker thread now reaches a remote edge, V5 is stored in the message buffer of Stage 1 for M4 since there may be a potential local match on M4 associated with Stage 2. A Stage 1 message including intermediate results stored in this message buffer is subsequently sent to M4 for matching at Stage 2.

M3 receives a Stage 0 message including intermediate results of V1 for further matching on M3 at Stage 1. Although Stage 1 matches on V3, there are no outgoing edges from V3. As a result, DFT terminates.

Similarly, M4 receives a Stage 0 message including intermediate results of V5 for further matching on M4 at Stage 1. Although Stage 1 matches on V6, there are no outgoing edges from V6. As a result, DFT terminates.

M2 receives a Stage 0 message including intermediate results of V1 for matching on M2 at Stage 2. As discussed above, worker threads prioritize messages from later stages to produce results sooner. As a result, M2 does work from the message associated with Stage 1 prior to doing work associated with Stage 0.

Since DFT is performed for local computations to eagerly produce results, on M2, Stage 1 is matched on V2 and Stage 2 is matched on V4 by one or more worker threads. Since there are no more stages, an output (e.g., V1-V2-V4) is produced, and the DFT backtracks to Stage 1 and depth first traversal is performed to the deepest depth indicated by the upper bound of the range of the regular expression. In this example, the deepest depth is 2 at Stage 1 before an edge is encountered. V1-V2-V4-V5 is stored as intermediate results in the depth 2 buffer of Stage 1. In an embodiment, only the source and current vertex are stored in the immediate results (e.g., matches at intermediate depths are not stored). For example, V1-V5 is stored as intermediate results in the depth 2 buffer of Stage 1. At some time, the intermediate results in the depth 2 buffer are copied to the message buffer of Stage 1 for M4 since there may be a potential local match on M4 associated with Stage 3. A Stage 1 message including intermediate results stored in this message buffer is subsequently sent to M4 for matching at Stage 2.

DFT recursively backtracks to depth 1 at Stage 1. V1-V2-V4 is stored as intermediate results in the message buffer of Stage 1 for M2. A Stage 1 message including intermediate results stored in this message buffer is subsequently sent to M2 for matching at Stage 2.

DFT recursively backtracks to depth 0 at Stage 1; however, Stage 1 does not match on any other vertices and DFT terminates.

M4 receives a Stage 1 message including the intermediate results of V4-V5, V2-V4-V5, and V1-V2-V3-V4-V5 for matching on M4 at Stage 2. On M4, Stage 2 is matched with V6. The results including V4-V5-V6, V2-V4-V5-V6, and V1-V2-V3-V4-V5-V6 are produced. Since M4 has processed the intermediate results for the final Stage 2, DFT terminates.

M2 receives a Stage 1 message including the intermediate results of V1-V2-V4 for matching on M2 at Stage 2. On M2, Stage 2 is matched on V5. The result including V1-V2-V4-

V5 is produced. Since M2 has processed the intermediate results for the final Stage 2, DFT terminates.

The final stage, Stage 2, forwards the outputs of the query.

Termination Protocol

An incremental query termination protocol is used to determine when a query evaluation has finished. Stages are completed one at a time, starting from the first one until the last one is reached. Since the system is distributed with asynchronous messaging, a stage s is considered to be complete only when all of the machines have indicated that s is completed by sending special done messages to all other machines. Once the done messages from all machines are received for a given stage, it may be completed and attempts to complete the next stage may begin. The query is terminated once the final stage has been completed. The stages produced by a query can both be repeatable and not repeatable (e.g., the pattern can be a combination of normal and regular path expressions). With this in mind, the termination protocol is a combination of the following two components: depth first traversal (DFT) termination and stage completion.

DFT termination. The traversal stops going deeper in the following occasions:
- The vertex does not satisfy the vertex filters of the stage being matched;
- There is no edge to follow that satisfies the edge filters of the hop being matched;
- An output is generated, and the current stage is the final stage and is not repeatable; or
- The current stage is a repeatable stage, and
  - the depth is greater than the upper bound of the range of the regular expression (if there is an upper bound, for example with {n,m}); or
  - a cycle has been detected.

Stage completion. For non-repeatable stages, the stage completion algorithm is defined by the asynchronous graph pattern-matching engine as:
1. Stage $s_0$ completes when all local computation is completed on each machine.
2. Stage $s_n$ completes when
   a. stage $s_{n-1}$ is completed, and
   b. all messages from stage $s_{n-1}$ are processed.

Stage completion is more complicated with repeatable stages. In an embodiment, incremental repeatable stage completion of a repeatable stage depends on completion of each depth. Depth d of the repeatable stage $s_n$ is completed when:
1. The last non-repeatable stage preceding $s_n$ is completed, if there is one;
2. Depending on whether $s_{n-1}$ is a repeatable stage or normal (non-repeatable) stage:
   a. $s_{n-1}$ is a non-repeatable stage: depth d−1 is completed and all messages from depth d−1 have been processed; or
   b. $s_{n-1}$ is a repeatable stage: depth d on $s_{n-1}$ is completed and all messages from depth d have been processed; and
3. All messages sent for current depth d have been successfully sent.

In an embodiment, if the repeatable stage is the first stage of the query, then bootstrapping is performed similarly as with the normal (non-repeatable) stages.

A repeatable stage is completed once all of its depths are completed. To detect when the final depth of the RPQ has been reached, each machine also keeps track of the maximal depth observed during the local computation of the RPQ, as well as the last completed depth such as by consensus of all machines.

With this information, repeatable stages are completed when:
1. Trying to complete the stage, first try to complete the next depth (the one after the final completed depth) by following the criteria above.
2. If machine k observes that it can complete the depth, then send done messages to all other machines containing the maximal observed depth.
3. Once all machines receive the done messages from all other machines, check whether the overall maximal observed depth is greater than the depth being completed. If a deeper depth has been observed, only complete the depth. If all machines agree there is no deeper depth, complete the whole repeatable stage.

Graph Cycles

In unbounded RPQs (e.g., using the quantifiers *, + or {n,}), the pattern matching will never end if there is no graph cycle detection. For instance, the RPQ shown in Table 2, A may know B via one or more hops. The graph cycle detection may use a mechanism that keeps track of the src→dst pairs such that dst is reachable from src, In one embodiment, the cycle detection includes:
- Adding the source vertex to the intermediate result of the pattern matching;
- When a vertex is reached from a source, record that the vertex was reached from the source such as by keeping this information on the destination vertex side of the pair;
- If a node is visited twice from the same source, then there is a loop and the traversal stops. As a side effect, this also eliminates duplicates from the result set, which may be a search requirement.

This embodiment of cycle detection inevitably consumes memory but assures that is no redundant computation.

Alternative options may be implemented. For example, an alternative is to keep a maximal allowed depth such that if this depth is exceeded, then there is surely a cycle in the graph. This alternative provides a tradeoff between memory consumption and execution time. Other options include:
- Keeping the pairs of reachable vertices as described above. Memory is needed for storing the pairs. However, there is no need for pre-processing steps as pairs are discovered along the traversals. This option completely eliminates unnecessary computations that result from graph cycles.
- Keeping the followed path in the intermediate result. Intermediate results are no longer fixed memory since the maximal path length is not known in advance. There is no need for pre-processing steps. To check whether a vertex has been visited before, the list of visited vertices has to be iterated and, thus, it cannot be done in constant time.
- Using the number of nodes as the maximal depth. No memory is needed for storing reachability. There is no need for pre-processing steps. However, this option is computationally intensive. This option does not remove duplicates.
- Using the graph diameter as the maximal depth. No memory is needed for storing reachability. Although this option requires pre-processing to compute the longest path in the graph, it is less computationally intensive than the previous option. This option does not remove duplicates.

Flow Control Considerations

Flow control ensures that machines are not over-flooded with messages by limiting the amount of outgoing unacknowledged messages from one machine to another. Each stage keeps track of the outgoing unacknowledged messages. A message is acknowledged once it has been fully processed on the next machine:
1. All local computation spawned from the message has been completed;
2. The IRs for the remote work spawned from the message have been successfully stored in buffers (particularly, message buffers in the case of the non-repeatable stages, and per-depth buffers in the case of the repeatable stages).

Once a message is acknowledged, the counter on the number of unacknowledged messages is decremented. For non-repeatable stages, this simple flow control protocol is enough because messages can only be sent from one stage to a later stage, meaning that with every message sent, computation progresses deeper. However, since a repeatable stage can send messages to itself, or even to prior stages (in the case of common path expressions), this can lead to a flow control blockade, as illustrated in FIG. 4.

Figure 4:
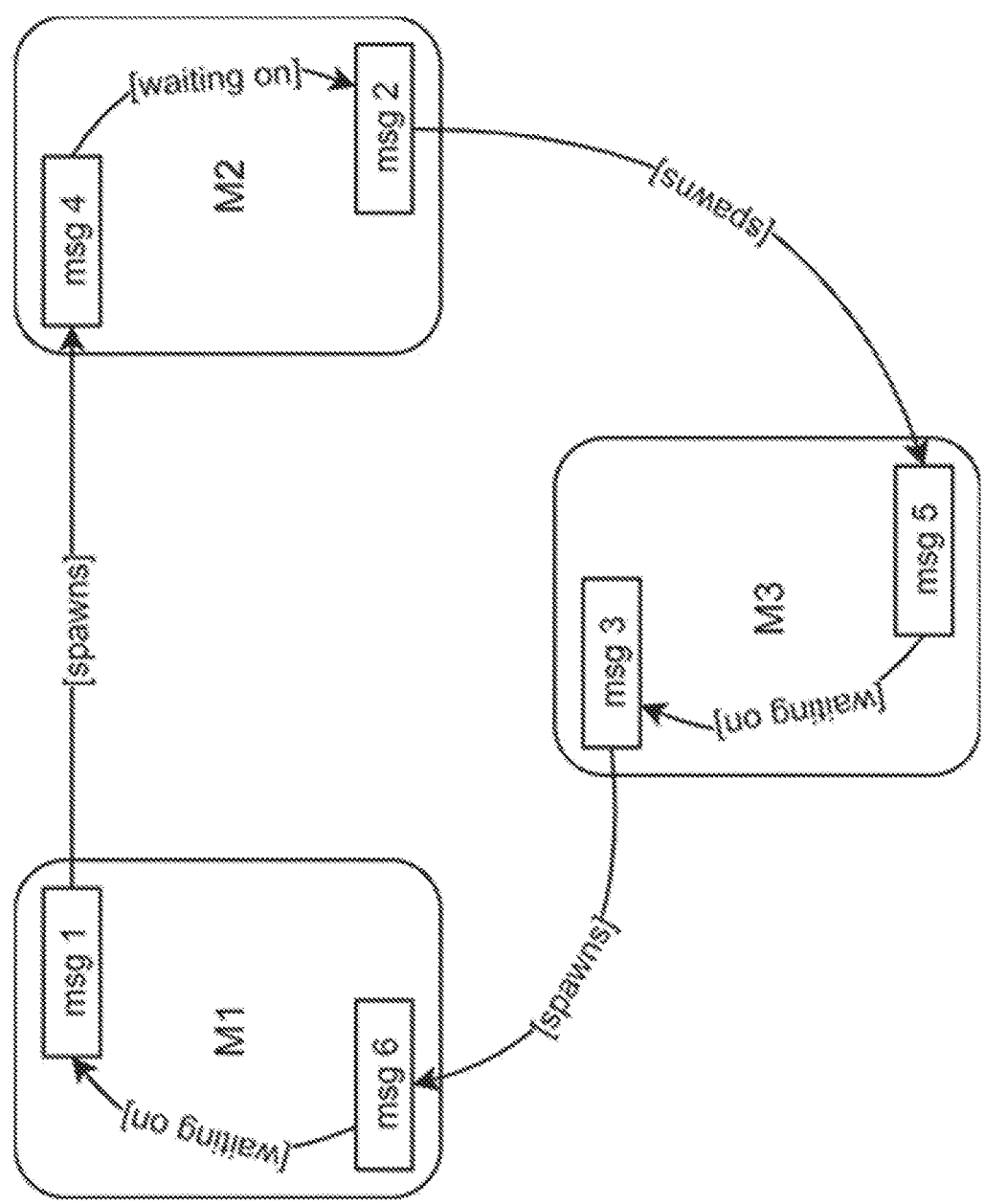
FIG. 4 illustrates an example flow control blockage.

Referring to FIG. 4, consider messages sent by a repeatable stage to itself and assume that the flow control allows one unacknowledged outgoing message per stage. Messages 1, 2 and 3 are spawned from the local computations on each of the machines M1, M2 and M3, respectively, and sent to the next machine to be processed. After these messages are picked up, they spawn local computations that eventually lead to the creation of additional messages 4, 5 and 6 for the same stage. These new messages are now blocked because the flow control for the stage disallows further messaging until the previous messages (messages 1, 2 and 3) have been acknowledged. As a result, the system will block, and the query will never finish.

To avoid this, in an embodiment, each repeatable stage keeps track of the depths of the computations for which there is at least one unacknowledged outgoing message (for example in a priority queue). If a thread doing a computation on depth d tries to copy the depth d buffer to a message buffer and is blocked by the global control, it is checked to determine whether d is deeper that the maximal depth in the priority queue. If this is the case, then the buffer is allowed to be copied to a message and sent bypassing the global flow control, and the depth d is added to the head of the priority queue. Once the message that bypassed flow control is acknowledged, depth d is popped from the queue. This mechanism ensures that the deepest computations are never blocked in favor of more shallow ones and that there is always progress. Put differently, an implementation can monitor memory consumption and allow only higher depths to proceed when the query memory exceeds some soft target threshold.

An Example Graph Search Process

FIGS. 5B-5C illustrate an example flow diagram that depicts a process 500 for evaluating an RPQ on a distributed graph. At step 505, a multi-node computing system generates, according to a path pattern, a data structure representing a plurality of stages and a plurality of hops. The multi-node computing system comprises a plurality of computing nodes. The plurality of stages includes at least one repeatable stage that is associated with a hop to itself. Each of the plurality of stages is associated with entity properties, and each of the hops is associated with relationship properties. The path pattern includes a regular expression such as:

(A) -/:knows+/-> (B) -[:is_friend]-> (C).

At step 510, the multi-node computing system evaluates the path pattern against a graph. The graph is distributed in the multi-node computing system such that each vertex in the graph is on a node of the multi-node computing system and each edge in the graph connects a source vertex with a destination vertex in the graph. An example process 550 of evaluating the path pattern against the graph is illustrated in FIG. 5C.

Referring to FIG. 5C, at step 555, a first node of the multi-node computing system, associated with a particular repeatable stage of the plurality of stages, maintains a plurality of message buffers that are each for a node of the multi-node computing system that is associated with a next stage of the plurality of stages that is subsequent to the particular repeatable stage.

At step 560, in response to the first node of the multi-node computing system storing thereon a first vertex in the distributed graph that satisfies entity properties of the particular repeatable stage and that has an edge in the distributed graph that satisfies relationship properties of the particular repeatable stage, depth first traversal is performed at the particular repeatable stage and intermediate results are stored in a per-depth buffer for a particular traversed depth.

In an embodiment, the depth first traversal stops when a depth being traversed is greater than the upper bound of a range of a regular expression in the path pattern or when a cycle in the graph is detected. The intermediate results include a followed path of vertices, with the last vertex in the followed path satisfying the entities properties of the particular repeatable stage and having a remote edge.

At step 565, when the per-depth buffer for the particular traversed depth meets size threshold criteria, data from the per-depth buffer for the particular traversed depth is stored in a first message buffer of the particular repeatable stage to send as a message to another node of the multi-node computing system to evaluate the next stage. The first message buffer of the particular repeatable stage is for the another node of the multi-node computing system, which stores thereon a second vertex in the distributed graph. The remote edge connecting the last vertex in the followed path and the second vertex satisfies relationship properties of a hop from the repeatable stage to the next stage.

After performing the depth first traversal at the particular repeatable stage and storing the intermediate results in the per-depth buffer for the particular traversed depth, the evaluation of the path pattern may include back traversing, at the particular repeatable stage, to a depth previous to the particular traversed depth. Intermediate results are stored in a per-depth buffer for the previous depth. When the per-depth buffer for the previous depth meets the size threshold criteria, data from the per-depth buffer for the previous depth is stored in a second message buffer of the particular repeatable stage. The second message buffer of the particular repeatable stage is for a node that stores thereon a third vertex in the distributed graph. The edge connecting the third vertex and the last vertex of a followed path stored in the per-depth buffer for the previous depth, satisfies relationship properties of the hop from the repeatable stage to the next stage.

The back traversal is recursively performed and stops when a depth being traversed is equal to the lower bound of the range of the regular expression in the path pattern. Intermediate results from matching are stored in a per-depth buffer corresponding to the depth back traversed. The particular repeatable stage is completed when all depths for the regular expression in the path pattern is completed.

In an embodiment, flow control of the particular repeatable stage has three components: a global flow control, a per-depth flow control, and a mechanism that ensures that the deepest depths are never blocked.

The global flow control may be used to limit a maximum number of outgoing messages from the particular repeatable stage. The message is sent to the another node of the multi-node computing system when a number of messages sent from the particular repeatable stage is less than a messages-sent threshold.

The per-depth flow control may be used to limit a maximum number of outgoing messages from a given depth of the particular repeatable stage.

The mechanism that ensures that the deepest depths are never blocked may be implemented by maintaining, by the particular repeatable stage, depths of the computations for which there is at least one unacknowledged outgoing message. In response to a global flow control blocking a request to store all data from the per-depth buffer in the message buffer of the particular repeatable stage, if it is determined that the particular depth is deeper than the maximum depth that is associated with the at least one unacknowledged outgoing message, then the global flow control is bypassed.

In an embodiment, a graph cycle in the distributed graph may be detected by storing a followed path as part of the intermediate results. If a vertex is found in the followed path, then a cycle has been detected and traversal stops going deeper.

Improvements and Advantages

Prior industry solutions are able to run RPQs on single machines. As the evaluation of some RPQs can be a very expensive task, having a single machine has severe limitation in terms of computing power and the amount of memory available. Because of this, a single machine will not be enough to perform this task on very large graphs. Approaches described herein provide a scalable solution to the problem in a distributed setting where additional resources may be increased by adding more machines if needed. At the same time, these approaches achieve limited memory usage to enable efficient usage of those machines. As a result, this solution can answer RPQs on a graph of any size, given enough machines.

Techniques described herein differ from prior industry solutions in at least the following aspects:
1. Within a single machine (following "local edges"), regular path matching is embedded in the depth first traversal of the graph, eliminating pre-processing steps required by state-of the-art approaches;
2. Overcomes technical challenges of distributing the RPQ processing in terms of message exchange between machines and flow control by:
   a. Keeping the amount of memory needed to a minimum, based on the graph properties (namely the diameter of the graph); and
   b. Thinning out computation as the DFT goes deeper, guaranteeing that the deepest computations are never blocked by flow control in favor of more shallow ones.

Altogether, techniques described, due to the DFT focus and the asynchronous messaging, achieve great performance while minimizing the amount of runtime memory.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Hardware Overview

Figure 6:
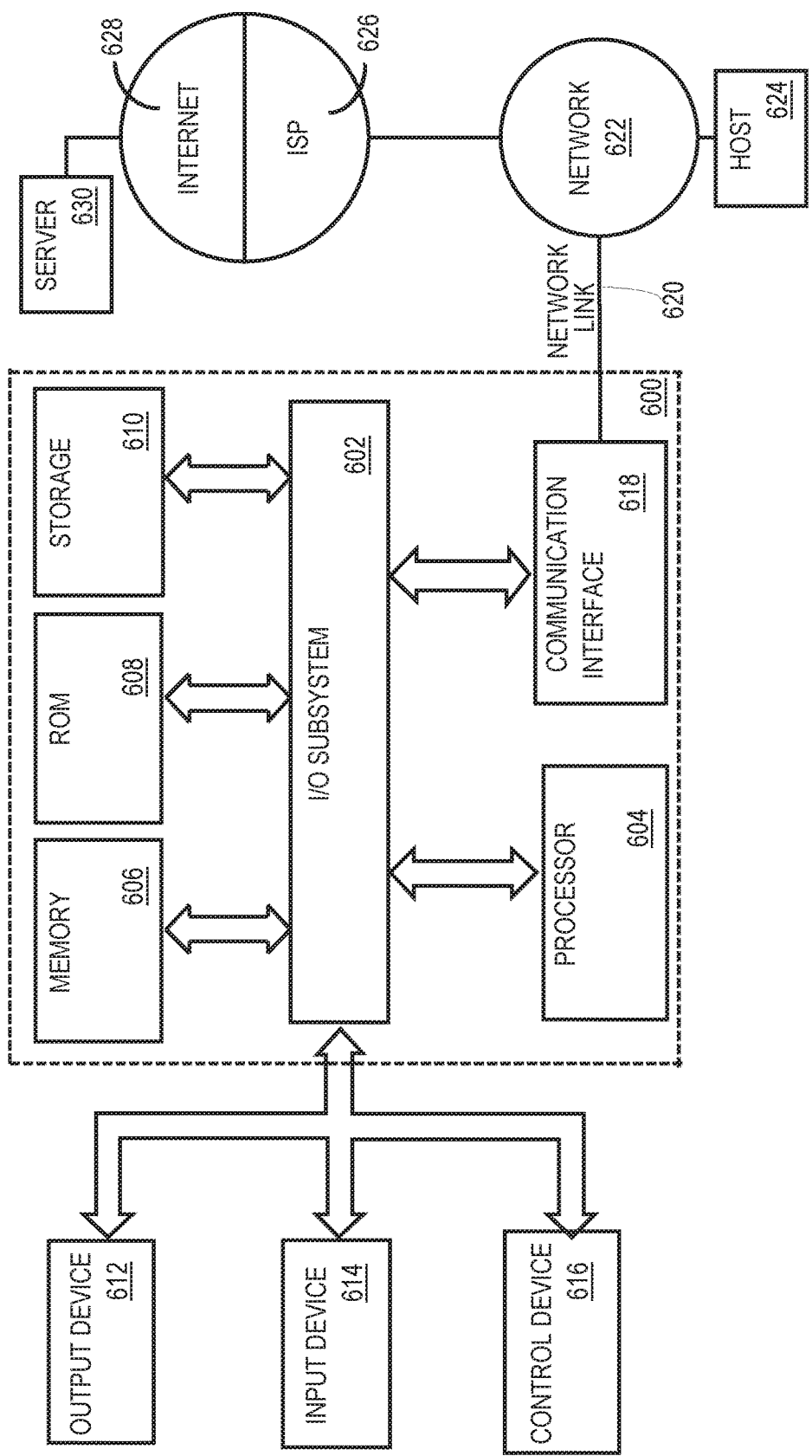
FIG. 6 illustrates a block diagram of a computing device in which the example embodiment(s) of the present invention may be embodiment.

Referring now to FIG. 6, it is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Software Overview

Figure 7:
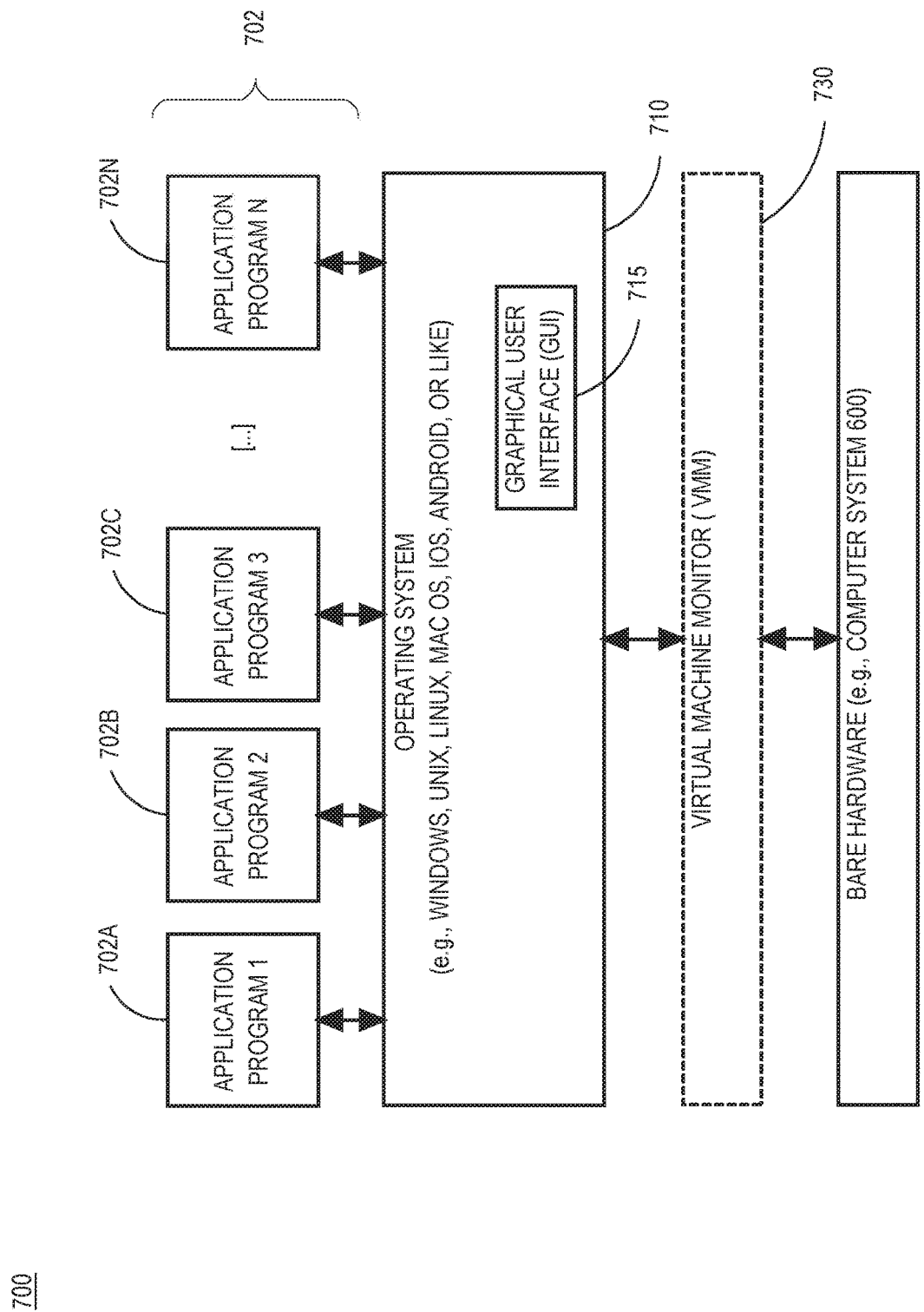
FIG. 7 illustrates a block diagram of a basic software system for controlling the operation of a computing device.

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
    a multi-node computing system generating a path pattern, said path pattern including a data structure representing a plurality of stages and a plurality of hops, and evaluating said path pattern against a graph;
    wherein said multi-node computing system comprising a plurality of computing nodes;
    wherein said plurality of stages includes at least one repeatable stage, said at least one repeatable stage is associated with a hop to said at least one repeatable stage;
    wherein each of said plurality of stages is associated with entity properties and each of said hops is associated with relationship properties;
    wherein said graph is distributed in said multi-node computing system such that each vertex in said graph is on a node of said multi-node computing system and each edge in said graph connects a source vertex with a destination vertex in said graph;
    wherein evaluating said path pattern against said distributed graph comprises:
        a first node of said multi-node computing system, associated with a particular repeatable stage of said plurality of stages, maintaining a plurality of message buffers, wherein said plurality of message buffers are each for an associated node of said multi-node computing system, wherein the associated node is associated with a next stage of said plurality of stages;
        in response to said first node of said multi-node computing system storing on said first node a first vertex in said distributed graph, wherein said first vertex satisfies entity properties of said particular repeatable stage:
            performing depth first traversal at said particular repeatable stage;
            storing intermediate results in a per-depth buffer for a particular traversed depth;
            when said per-depth buffer for said particular traversed depth meets size threshold criteria, storing data from said per-depth buffer for said particular traversed depth in a first message buffer of said particular repeatable stage to send as a message to another node of said multi-node computing system to evaluate a said next stage, wherein said another node of said multi-node computing system storing on said another node a second vertex in said distributed graph.

2. The method of claim 1, wherein the intermediate results include a followed path of vertices, wherein the last vertex in the followed path satisfies the entities properties of the particular repeatable stage and having a remote edge, wherein the remote edge connecting the last vertex in the followed path and the second vertex satisfies relationship properties of a hop from the repeatable stage to the next stage.

3. The method of claim 1, wherein evaluating said path pattern against said distributed graph further comprises:
    back traversing at said particular repeatable stage to a depth previous to said particular traversed depth;
    storing intermediate results in said per-depth buffer for said previous depth;
    when said per-depth buffer for said previous depth meets said size threshold criteria, storing data from said per-depth buffer for said previous depth in a second message buffer of said particular repeatable stage.

4. The method of claim 1, wherein said depth first traversal stops when a depth being traversed is greater than said upper bound of a range of a regular expression in said path pattern or when a cycle in said graph is detected.

5. The method of claim 1, wherein evaluating said path pattern against said distributed graph further comprises completing said particular repeatable stage, wherein said particular repeatable stage is completed when all depths for a regular expression in said path pattern are completed.

6. The method of claim 1, wherein evaluating said path pattern against said distributed graph further comprises detecting a graph cycle in said distributed graph by storing a followed path as part of the intermediate results.

7. The method of claim 1, wherein evaluating said path pattern against said distributed graph further comprises using a global flow control to limit a maximum number of outgoing messages from said particular repeatable stage.

8. The method of claim 7, wherein said message is sent to said another node of said multi-node computing system when a number of messages sent from said particular repeatable stage is less than a messages-sent threshold.

9. The method of claim 1, wherein evaluating said path pattern against said distributed graph further comprises using a per-depth flow control to limit a maximum number of outgoing messages from a given depth of said particular repeatable stage.

10. The method of claim 1, wherein evaluating said path pattern against said distributed graph further comprises:
    maintaining depths of computations for which there is at least one unacknowledged outgoing message;

in response to a global flow control blocking a request to store all data from said per-depth buffer in said message buffer of said particular repeatable stage,
determining that said particular depth is deeper than said maximum depth that is associated with said at least one unacknowledged outgoing message and, in response, bypassing said global flow control.

11. One or more non-transitory storage media storing sequences of instructions which, when executed by one or more processors, cause:
a multi-node computing system generating a path pattern, said path pattern including a data structure representing a plurality of stages and a plurality of hops, and evaluating said path pattern against a graph;
wherein said multi-node computing system comprising a plurality of computing nodes;
wherein said plurality of stages includes at least one repeatable stage, said at least one repeatable stage is associated with a hop to said at least one repeatable stage;
wherein each of said plurality of stages is associated with entity properties and each of said hops is associated with relationship properties;
wherein said graph is distributed in said multi-node computing system such that each vertex in said graph is on a node of said multi-node computing system and each edge in said graph connects a source vertex with a destination vertex in said graph;
wherein evaluating said path pattern against said distributed graph comprises:
a first node of said multi-node computing system, associated with a particular repeatable stage of said plurality of stages, maintaining a plurality of message buffers, wherein said plurality of message buffers are each for an associated node of said multi-node computing system, wherein the associated node is associated with a next stage of said plurality of stages;
in response to said first node of said multi-node computing system storing on said first node a first vertex in said distributed graph, wherein said first vertex satisfies entity properties of said particular repeatable stage:
performing depth first traversal at said particular repeatable stage;
storing intermediate results in a per-depth buffer for a particular traversed depth;
when said per-depth buffer for said particular traversed depth meets size threshold criteria, storing data from said per-depth buffer for said particular traversed depth in a first message buffer of said particular repeatable stage to send as a message to another node of said multi-node computing system to evaluate a said next stage, wherein said another node of said multi-node computing system storing on said another node a second vertex in said distributed graph.

12. The one or more non-transitory computer-readable storage media of claim 11, wherein the intermediate results include a followed path of vertices, wherein the last vertex in the followed path satisfies the entities properties of the particular repeatable stage and having a remote edge, wherein the remote edge connecting the last vertex in the followed path and the second vertex satisfies relationship properties of a hop from the repeatable stage to the next stage.

13. The one or more non-transitory computer-readable storage media of claim 11, wherein evaluating said path pattern against said distributed graph further comprises:
back traversing at said particular repeatable stage to a depth previous to said particular traversed depth;
storing intermediate results in said per-depth buffer for said previous depth;
when said per-depth buffer for said previous depth meets said size threshold criteria, storing data from said per-depth buffer for said previous depth in a second message buffer of said particular repeatable stage.

14. The one or more non-transitory computer-readable storage media of claim 11, wherein said depth first traversal stops when a depth being traversed is greater than said upper bound of a range of a regular expression in said path pattern or when a cycle in said graph is detected.

15. The one or more non-transitory computer-readable storage media of claim 11, wherein evaluating said path pattern against said distributed graph further comprises completing said particular repeatable stage, wherein said particular repeatable stage is completed when all depths for a regular expression in said path pattern are completed.

16. The one or more non-transitory computer-readable storage media of claim 11, wherein evaluating said path pattern against said distributed graph further comprises detecting a graph cycle in said distributed graph by storing a followed path as part of the intermediate results.

17. The one or more non-transitory computer-readable storage media of claim 11, wherein evaluating said path pattern against said distributed graph further comprises using a global flow control to limit a maximum number of outgoing messages from said particular repeatable stage.

18. The one or more non-transitory computer-readable storage media of claim 17, wherein said message is sent to said another node of said multi-node computing system when a number of messages sent from said particular repeatable stage is less than a messages-sent threshold.

19. The one or more non-transitory computer-readable storage media of claim 11, wherein evaluating said path pattern against said distributed graph further comprises using a per-depth flow control to limit a maximum number of outgoing messages from a given depth of said particular repeatable stage.

20. The one or more non-transitory computer-readable storage media of claim 11, wherein evaluating said path pattern against said distributed graph further comprises:
maintaining depths of computations for which there is at least one unacknowledged outgoing message;
in response to a global flow control blocking a request to store all data from said per-depth buffer in said message buffer of said particular repeatable stage,
determining that said particular depth is deeper than said maximum depth that is associated with said at least one unacknowledged outgoing message and, in response, bypassing said global flow control.

* * * * *

UNITED STATES PATENT AND TRADEMARK OFFICE
CERTIFICATE OF CORRECTION

PATENT NO. : 11,456,946 B2
APPLICATION NO. : 16/899185
DATED : September 27, 2022
INVENTOR(S) : Tonkovic et al.

It is certified that error appears in the above-identified patent and that said Letters Patent is hereby corrected as shown below:

On the Title Page

On page 2, Column 2, Item (56) under Other Publications, Line 9, delete "Endowmwnt," and insert -- Endowment, --, therefor.

On page 2, Column 2, Item (56) under Other Publications, Line 69, delete "s3.thinkaurellus." and insert -- s3.thinkaurelius. --, therefor.

On page 3, Column 1, Item (56) under Other Publications, Line 1, delete "Yars" and insert -- Yan --, therefor.

On page 3, Column 1, Item (56) under Other Publications, Line 24, delete "ak," and insert -- al., --, therefor.

On page 3, Column 1, Item (56) under Other Publications, Line 24, delete ""Cachesensitive" and insert -- "Cache sensitive --, therefor.

On page 3, Column 1, Item (56) under Other Publications, Line 25, delete "Taversais" and insert -- Traversals --, therefor.

On page 3, Column 1, Item (56) under Other Publications, Line 35, delete "Grade" and insert -- Oracle --, therefor.

On page 3, Column 2, Item (56) under Other Publications, Line 16, delete "Lanuage"," and insert -- Language", --, therefor.

On page 3, Column 2, Item (56) under Other Publications, Line 33, delete "Confrence," and insert -- Conference, --, therefor.

Signed and Sealed this
Fourteenth Day of March, 2023

Katherine Kelly Vidal
*Director of the United States Patent and Trademark Office*

CERTIFICATE OF CORRECTION (continued)
U.S. Pat. No. 11,456,946 B2

In the Drawings

On sheet 8 of 8, in Fig. 7, under Reference Numeral 730, Line 1, delete "( VMM)" and insert -- (VMM) --, therefor.

In the Specification

In Column 5, Line 66, delete "shows a shows an" and insert -- shows an --, therefor.

In the Claims

In Column 23, Line 8, delete "storage" and insert -- computer-readable storage --, therefor.